(12) United States Patent
Raghav et al.

(10) Patent No.: US 10,521,388 B2
(45) Date of Patent: Dec. 31, 2019

(54) MULTI-UPLINK DEVICE ENUMERATION AND MANAGEMENT

(71) Applicant: Intel Corporation, Santa Clara, CA (US)

(72) Inventors: Vinay Raghav, Folsom, CA (US); David J. Harriman, Portland, OR (US); Utkarsh Y. Kakaiya, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/146,466

(22) Filed: Sep. 28, 2018

(65) Prior Publication Data

US 2019/0042508 A1 Feb. 7, 2019

(51) Int. Cl.
*G06F 13/12* (2006.01)
*G06F 13/40* (2006.01)
*G06F 9/30* (2018.01)
*G06F 12/06* (2006.01)
*G06F 13/42* (2006.01)

(52) U.S. Cl.
CPC ...... *G06F 13/4004* (2013.01); *G06F 9/30141* (2013.01); *G06F 12/0692* (2013.01); *G06F 13/4282* (2013.01); *G06F 2212/2542* (2013.01); *G06F 2213/0026* (2013.01)

(58) Field of Classification Search
CPC .............................. G06F 13/12; G06F 13/4282
USPC ......................................................... 710/305
See application file for complete search history.

(56) References Cited

U.S. PATENT DOCUMENTS

| | | | |
|---|---|---|---|
| 2002/0152371 A1* | 10/2002 | Lee ........................ | G06F 9/4405 713/2 |
| 2003/0131067 A1* | 7/2003 | Downer .................... | G06F 9/54 709/213 |
| 2005/0038947 A1* | 2/2005 | Lueck ................. | G06F 13/4031 710/315 |
| 2008/0127326 A1* | 5/2008 | Dugan .................. | G06F 9/5077 726/15 |
| 2012/0297159 A1* | 11/2012 | Honda .................. | G06F 3/0605 711/165 |
| 2015/0067229 A1* | 3/2015 | Connor ............... | G06F 13/4022 710/317 |
| 2015/0220409 A1* | 8/2015 | Shao .................... | G06F 11/2007 714/4.5 |

* cited by examiner

*Primary Examiner* — Titus Wong
(74) *Attorney, Agent, or Firm* — Alliance IP, LLC

(57) ABSTRACT

A device includes a plurality of ports and a plurality of capability registers that correspond to a respective one of the plurality of ports. The device is to connect to one or more processors of a host device through the plurality of ports, and each of the plurality of ports comprises a respective protocol stack to support a respective link between the corresponding port and the host device according to a particular interconnect protocol. Each of the plurality of capability registers comprises a respective set of fields for use in configuration of the link between its corresponding port and one of the one or more processors of the host device. The fields include a field to indicate an association between the port and a particular processor, a field to indicate a port identifier for the port, and a field to indicate a total number of ports of the device.

20 Claims, 11 Drawing Sheets

| 31 | | | | 0 | Offset |
|---|---|---|---|---|---|
| \<DVSEC defined header\> | | | | ... | |
| Socket | Option | Port # | # Ports | | 0Ch (Capability Reg. – HW/init) |
| SetFence | | Reserved | Capabilities Vector | | 10h (Control Reg. – RW) |
| ReadFence | | Reserved | Control Vector | | 14h (Status Reg. – RO) |
| | | | Port Up/Down State Vector | | |
| UUID DW0 | | | | | 0Ch |
| UUID DW1 | | | | | 10h |
| UUID DW2 | | | | | 14h |
| UUID DW3 | | | | | 18h |
| Shared Scratch Size (N) | | Port-to-Port Scratch Size (M) | | | 1Ch |
| [[ 0 to N-1 DW of shared Read/Write scratchpad ]] | | | | | 24h |
| ... | | | | | ...24h + N-1 |
| [[ 0 to N-1 DW of Port X Write to Port K Read scratchpad ]] | | | | | 24h + N |
| ... | | | | | 24h + N + M-1 |
| [[ repeat Port to Port for each K ≠ K ]] | | | | | ... |

Shared Scratch

Port-to-Port Scratch

*FIG. 6*

MULTI-UPLINK DEVICE ENUMERATION AND MANAGEMENT

FIELD

This disclosure pertains to computing system, and in particular (but not exclusively) to enumeration and management of multi-uplink devices.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. In implementations such as the above, as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

For instance, in a multi-socket system, endpoint devices may be connected to one socket and utilize a processor interconnect for communicating across sockets. With newer device capabilities, the bandwidth supported by endpoint devices may increase and hence substantially increase cross-socket traffic in a multi-socket system. This may introduce tremendous bandwidth pressure across the processor interconnect resulting in overall system performance drop. In addition, a single port on a host device may be insufficient to meet the additional bandwidth capabilities of the device.

BRIEF DESCRIPTION OF THE DRAWINGS

FIG. 6 illustrates an embodiment of a capability register structure to be implemented by a multi-link peripheral device for configuring multiple communication links between the peripheral device and one or more processors.

DETAILED DESCRIPTION

Figure 1:
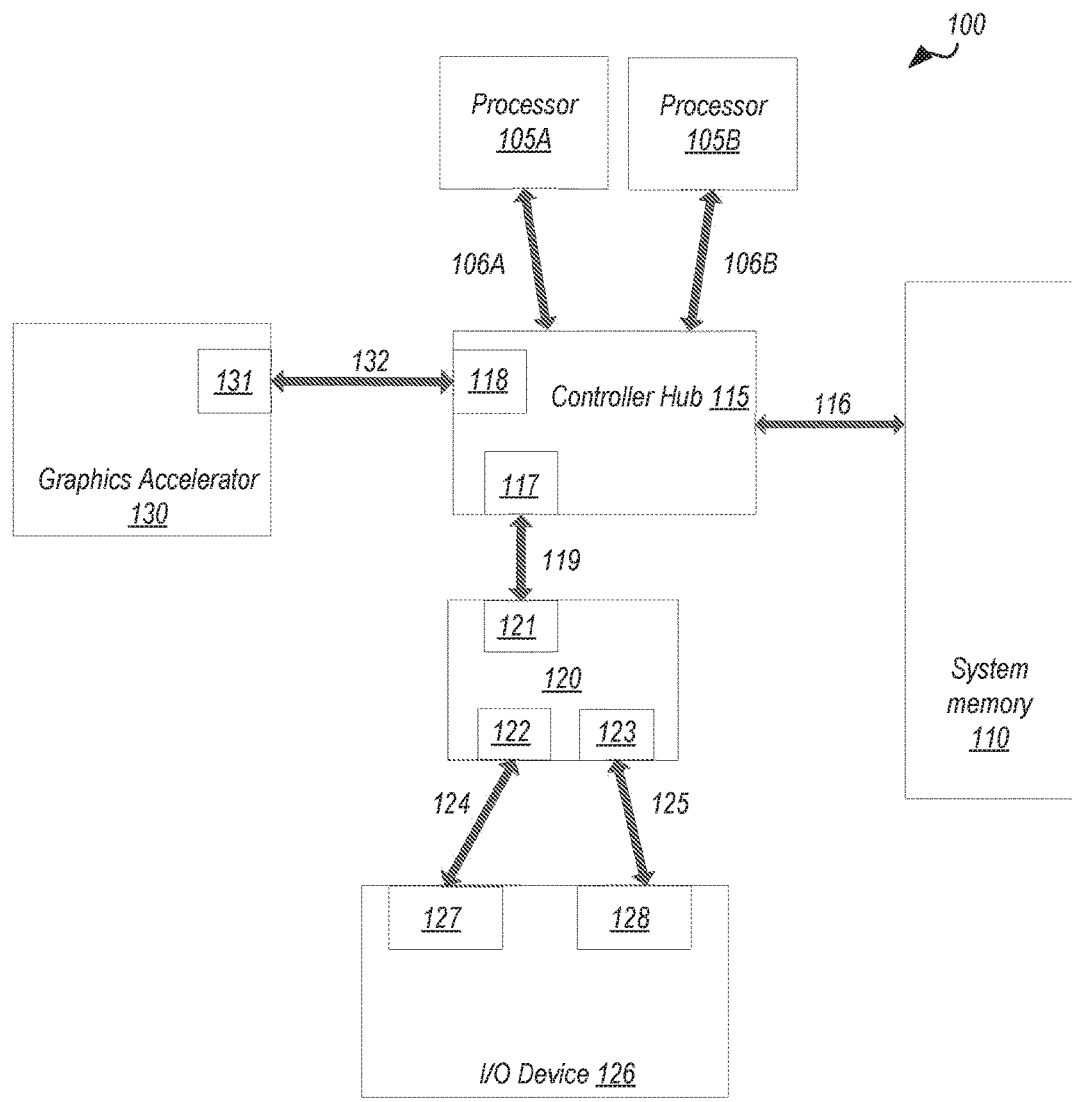
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to enhancements in specific computing systems, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the embodiments described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard, Rack Scale, and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processors 105 and system memory 110 coupled to controller hub 115. Each processor 105 includes any processing element, such as a microprocessor, a host processor, an embedded processor, a co-processor, or other processor. The processors 105 may be coupled to controller hub 115 through front-side bus (FSB) 106. In one embodiment, FSB 106 may be a serial point-to-point interconnect as described below. In another embodiment, link 106 includes a serial, differential interconnect architecture that is compliant with different interconnect standard. In some implementations, the system may include logic to implement multiple protocol stacks and further logic to negotiation alternate protocols to be run on top of a common physical layer, among other example features.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems may include an MCH integrated with processors 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120. In the example shown, the device 126 is a multi-link device coupled to the switch 120 over communication links 124 (between interface/port 122 and 127) and 125 (between interface/port 123 and 128).

Switch/bridge 120 routes packets/messages from device 126 upstream, i.e. up a hierarchy towards a root complex, to controller hub 115 and downstream, i.e. down a hierarchy away from a root controller, from processors 105 or system memory 110 to device 126. Switch 120, in one embodiment, is referred to as a logical assembly of multiple virtual PCI-to-PCI bridge devices. Device 126 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 126 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 126, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links of the system can include one or more extension devices, such as retimers, repeaters, etc.

Figure 2:
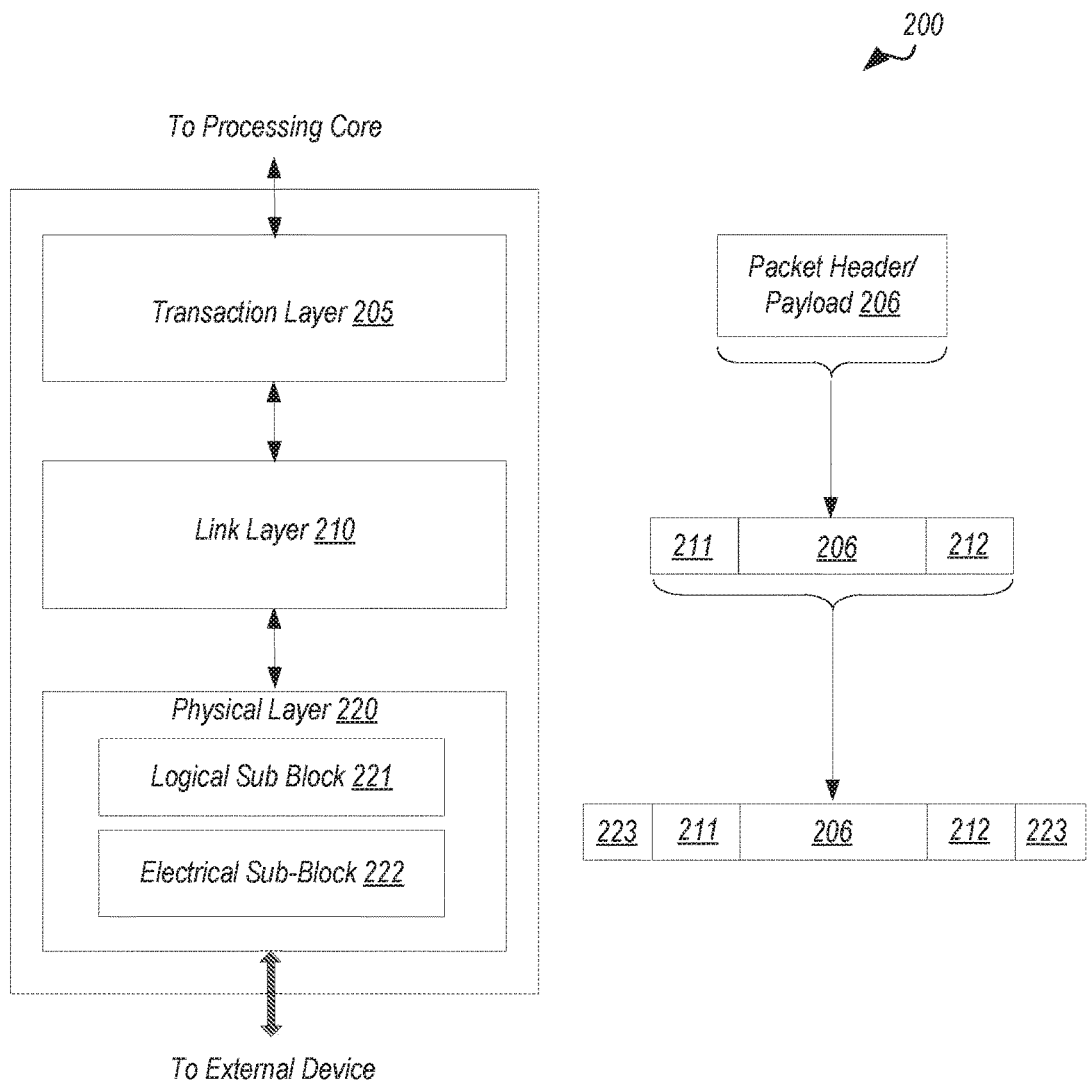
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, an Ultra Path Interconnect (UPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 123, 127, 128, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
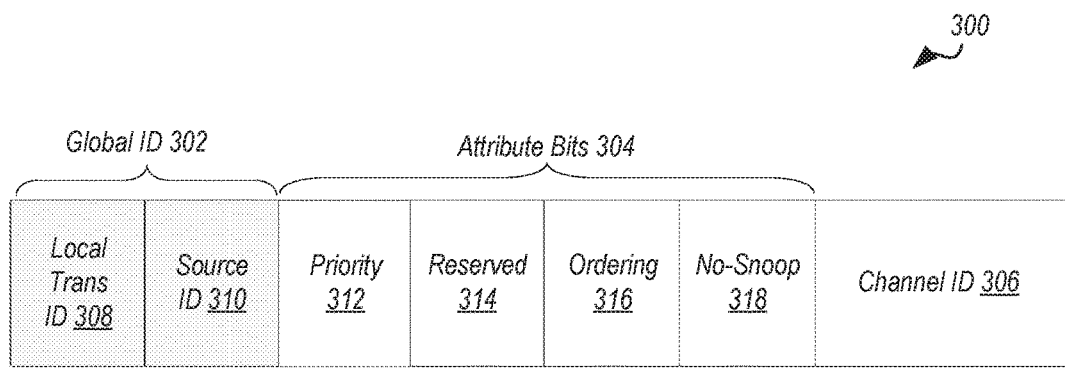
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 220. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
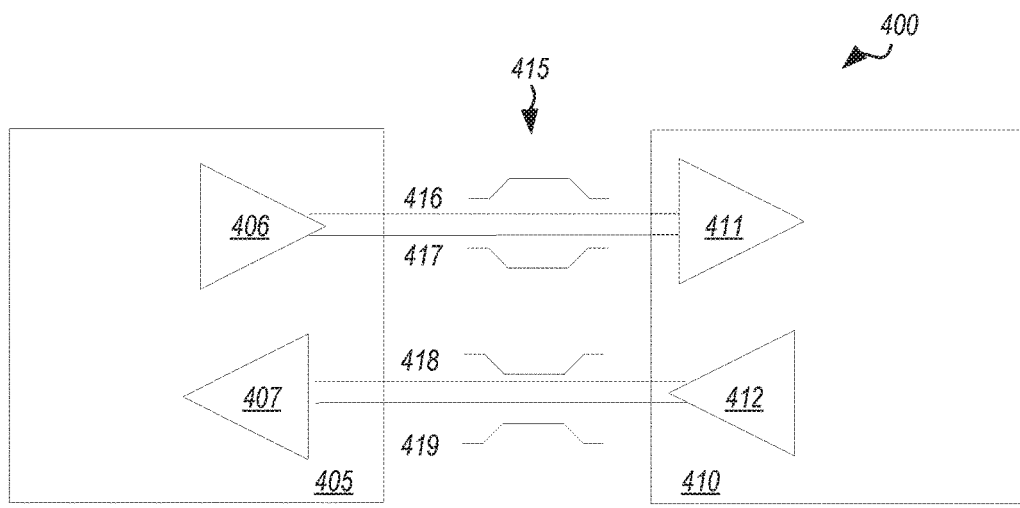
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In some implementations, a high-performance interconnect and corresponding interconnect protocol (e.g., such as a next generation PCIe-based interconnect) may be provided that is capable of operating at high speeds such as 25 GT/s and/or 32 GT/s. In one example, two speeds may be defined for the high performance interconnect, one at 25 GT/s and 32 GT/s, based on the characteristics determined for the channel (e.g., during link training). The interconnect, in one implementation, may be backwards compatible with existing PCIe generations and speeds provided for these generations (e.g., 8 GT/s, 16 GT/s, etc.).

In some instances, PCIe defines a "Designated Vendor Specific Extended Capability" (DVSEC), which is an extended capability that can be used by a vendor to define a configuration register structure while providing a consistent hardware/software interface. PCIe DVSEC is a PCIe extended capability that is permitted to be implemented by any PCIe function or RCRB. As described herein, DVSEC extended capability may be used by a multi-uplink PCIe device/endpoint (e.g., a device with two or more uplink capabilities such that it can be connected to two or more PCIe ports). In the case of a dual uplink device, for example, each half of the device may have a separate bus device function (BDF) and may present itself as a unique endpoint to system software.

Typically, in a multi-socket system, PCIe endpoints are connected to one particular socket and utilize the coherent processor interconnects (e.g., a QPI or UPI) for communicating cross-socket. For example, PCIe Gen4 capable devices may support an endpoint bandwidth up to 16 Gbps per lane and therefore may substantially increase cross-socket traffic in a multi-socket system. This may introduce tremendous bandwidth pressure across the processor interconnect resulting in overall system performance decreases. In addition, in some cases, a single x16 PCIe port on the host may be insufficient to meet the bandwidth demands of the endpoint. Further, connecting a PCIe endpoint to only one socket creates a single point of failure, compromising the reliability, accessibility, and serviceability aspect of a server class system.

Accordingly, in certain embodiments, a PCIe DVSEC may be implemented within a multi-uplink PCIe device and a host device may include corresponding software to enumerate and manage the multi-uplink capabilities of the device. This may allow the host system software to set an affinity of the device to the appropriate socket/NUMA node and ensure that the affinity is maintained during runtime. Accordingly, host system software can ensure affinity which allows each portion of the multi-link device to contain its traffic to the socket to which it's connected, thereby reducing pressure on cross-socket interconnects. Further, by connecting each interface/port of a multi-uplink device to a different socket, the system as a whole can be made more robust or help meet bandwidth demands of the device in cases where a single uplink might not be sufficient.

Figure 5A:
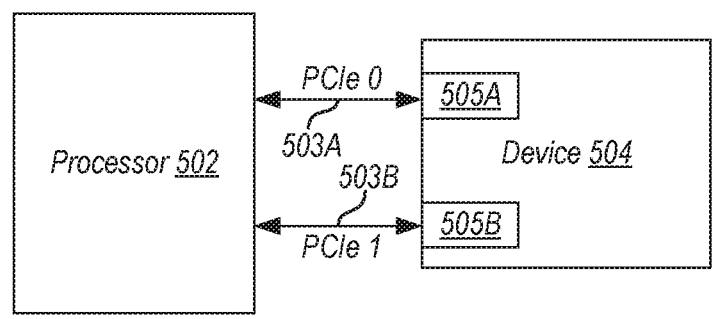
FIGS. 5A-5C illustrate example embodiments of a multi-link peripheral device connected to processors over multiple communication links.
Figure 5B:
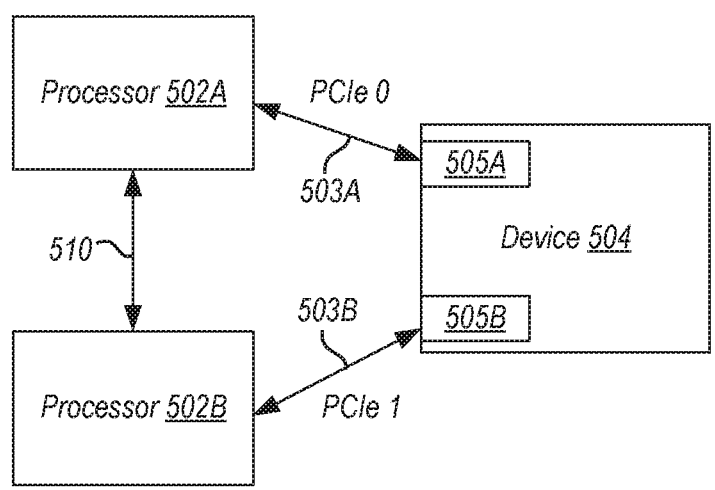
Figure 5C:
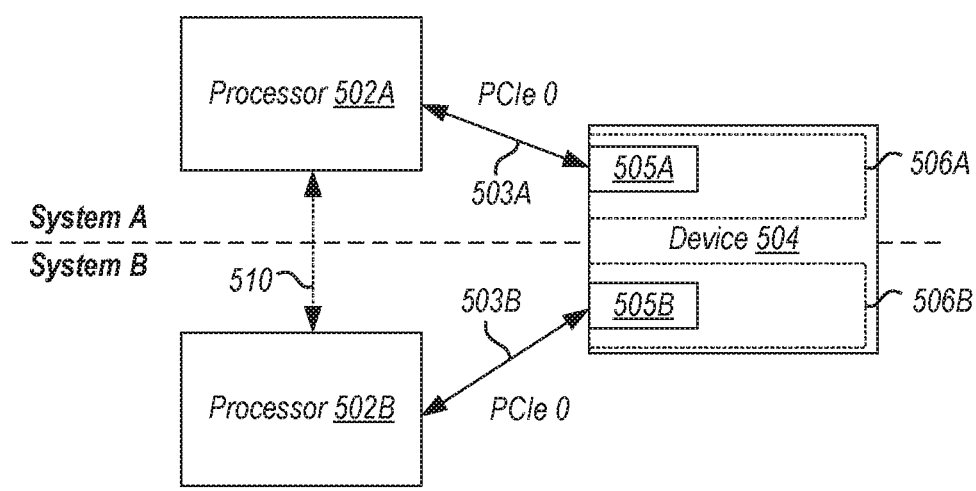

FIGS. 5A-5C illustrate example embodiments of a multi-link peripheral device 504 connected to processors 502 over multiple communication links 503. In the examples shown, the communication links 503 are PCIe links between the processors 502 and the peripheral device 504 through an interconnect architecture (e.g., an interconnect architecture similar to the one shown in FIG. 1 and described above). The example peripheral device 504 shown in FIGS. 5A-5C includes two PCIe ports 505 but may include additional PCIe ports 505 in some cases. Each PCIe port 505 is connected to a processor 502 (the same or different processors) over a respective PCIe link 503.

In some instances, a single x16 PCIe port for a processor socket may be inadequate to fully address the bandwidth requirements of a PCIe endpoint. By connecting the endpoint to the processor socket over multiple PCIe links (e.g., as shown in FIG. 5A, where the multi-link peripheral device 504 is connected to a single processor 502 over two PCIe links 503), such issues may be avoided.

In some instances, bandwidth on a single PCIe link between an endpoint and a processor may be adequate, but cross-socket traffic (e.g., when another processor accesses capabilities of the endpoint) may bog down the coherent processor interconnect link between the sockets, hurting system performance. By connecting the endpoint to each processor socket through respective PCIe links (e.g., as shown in FIG. 5B, where the multi-link peripheral device 504 is connected to each processor 502 over a separate PCIe link 503), cross-socket traffic (e.g., over the coherent processor interconnect 510 in FIG. 5B) may be reduced.

In some instances, a two-socket system may be configured as separate single socket systems (e.g., as shown in FIG. 5C, wherein each processor 502 is configured as a separate system), or an endpoint may be connected to two separate, single-socket systems. In such cases, endpoints connected to a single socket represent a single point of failure. Multi-uplink with each endpoint port functioning independently (e.g., as shown in FIG. 5C, where the multi-link peripheral device 504 is connected to each processor 502 over an independent PCIe link 503) allows for improved robustness and resiliency.

FIG. 6 illustrates an embodiment of a capability register structure 600 to be implemented by a multi-link peripheral device for configuring multiple communication links between the peripheral device and one or more processors. In the example shown, the capability register structure 600 is an extended capability structure compliant with the PCIe protocol and is formatted in a DVSEC structure. In certain embodiments, the example capability register structure 600 may be stored in hardware registers of a multi-link peripheral device and read by the host device, which in turn configures the multiple communication links based on the capability register structure 600. Each interface, or port, of a multi-uplink peripheral device may have an associated capability register structure similar to the capability register structure 600. Thus, in certain embodiments, each port of a multi-uplink peripheral device will have its own DVSEC definition stored in the hardware registers of the device. Table 1 below describes certain fields of the capability register structure 600 and their associated attributes.

TABLE 1

DVSEC field definitions

| Field(s) | Attributes |
| --- | --- |
| Socket | RW/HwInit |
| Option | HwInit |
| Port # (X of Y) | HwInit |
| # Ports (Y) | HwInit |
| Capability Vector | HwInit |
| SetFence | RW |
| Control Vector | RW |
| ReadFence | RO |
| Port Up/Down State Vector | RO |
| UUID—Universally Unique Identifier | HwInit |
| Shared Scratch | RW |
| Port-to-Port Scratch | RO/RW |

In the example shown, the Socket field indicates a processor or node association (e.g., a Non-Uniform Memory Access (NUMA) node association) for a particular port of the peripheral device, the Port # field indicates a port identifier for the particular port, the # Ports indicates a total number of ports for the peripheral device (all ports of the device will report the same value here), the Option field indicates a dependency (or lack thereof) for the particular port, the Capability Vector indicates certain other device capabilities, the SetFence and ReadFence fields indicate operation checkpoints for the particular port (as described further below), the Control Vector field indicates certain control bits, the Port Up/Down State Vector field indicates certain state bits for the particular port, the UUID fields indicate a UUID for the peripheral device (all ports of the device will report the same value here), the Port-to-Port Scratch Size field indicates a size (M) of the Shared Scratch, the Port-to-Port Scratch fields include information that is shared between the particular port and another port of the peripheral device, the Shared Scratch Size field indicates a size (N) of the Shared Scratch, and the Shared Scratch fields include information that is shared between all ports of the peripheral device.

In some embodiments, the contents of the Socket field may be written by system firmware or software to indicate which socket the port is associated with. The information in this field may be read back, in some cases, by a device driver in certain operating system environments that do not provide the socket association information directly to the driver. In some embodiments, the Option field may include encodings such as, for example: "00b—Independent" (indicating that the port is independent of other ports), "01b—Migratory" (indicating that the port is migratory), or "10b—Co-dependent" (indicating that the port is co-dependent on another port of the device). Each capability register may report the same value in the Option field. In some embodiments, the Shared Scratch fields implement a mailbox of variable size and act as a shared read/write space that is atomically updated and is visible by other ports of the device (as described below). In some cases, the Shared Scratch may be used as a mechanism to communicate between firmware, drivers, and an OS of the host device. In some embodiments, the Port-to-Port Scratch fields implement a port-to-port mailbox of variable size. In some cases, the Port-to-Port Scratch may be used to enable communication between driver instances in cases where this might not be possible using software.

In some instances, the DVSEC structure allows host software to: identify an identification of a multi-uplink capable device; uniquely identify each instance of such a device; discover the dependencies (or lack of) between each device instance; identify a shared read/write scratch pad (for communication between ports of the device); identify each port within a device and it's NUMA node/socket association; identify a "commit fence" to mark checkpoints; a port-to-port scratch pad (for communication between two specific ports of the device); and identify a scoreboard for the port and a status of other ports that can work with this port.

In some embodiments, the DVSEC structure implements a commit fence mechanism using the SetFence and Read-Fence fields. This mechanism operates independently at each port and provides a device-independent mechanism to establish checkpoints during operation of the peripheral device. Initially, the value of the SetFence field may be all 0's and the value of the ReadFence field may be all 1's. To use the commit fence mechanism, host software may write a value to the SetFence field different from the value previously written, for example by reading the ReadFence field, incrementing the value, and writing that back to the SetFence field. The host software may then poll the Read-Fence field. The device, through implementation-specific means, can track all operations in progress at the time the SetFence field is modified, and once all of these operations have completed the device can reflect the value written to the SetFence field as the value read from the ReadFence field. In some cases, the host software might not be required to wait on the completion of a prior checkpoint before writing a new value to the SetFence field, and in such cases, the device may be permitted to skip earlier checkpoints and reflect only the most recently written checkpoint value. By applying this mechanism along with the port-to-port or shared scratch mechanisms described below, checkpoints can be coordinated across multiple ports to establish checkpoints at the level of the entire device.

In some embodiments, the DVSEC structure implements a "scratchpad" or mailbox mechanism for port-to-port communication. This mechanism may provide a device-independent mechanism to establish a messaging mechanism between ports, e.g. to enable communication between driver instances in cases where this might not be possible or desirable through software. In some cases, the scratch pad mechanism may include a shared scratch mechanism whereby certain registers (which may be read/write capable for all ports on the device) are used for communication between the ports of the device. In some cases, the scratch pad mechanism may include a port-to-port scratch mechanism whereby certain registers (which may be read/write or read-only capable) are used for communication between two specific ports of the device. In some instances, all ports of the device indicate the same level of scratch capability.

In some embodiments, the data structure for the scratch may include a first doubleword (DW) containing: (1) byte indicating the number of DW of Shared Scratch (if not implemented this value may be set to 0), and (2) a byte indicating the number of DW, per Port, of Port to Port scratch (if not implemented this value may be set to 0). The first DW may be followed by the number of DWs indicated for the Shared Scratch. If implemented, Shared Scratch may work using space that is read/write capable by all ports of the device. All writes to the Shared Scratch space may be visible to all other ports (including the one that wrote to the space) simultaneously and may be observed in order. In some cases, a delay (of say 2 us) may be permitted from the time of writing to visibility. Specific rules for using the Shared Scratch space may be defined by host software (e.g., the operating system, virtual machine manager, device class, or in a device-specific way). The Shared Scratch space may be followed by (Y−1) times the number of DWs indicated for the Port-to-Port scratch. These DWs may be read-only to this port, and may be arranged in order by port number. The block that would correspond to this port may be skipped. For instance, if the current port is #2 of 0-3, then the blocks would be for ports 0, 1, 3. This would then be followed by $(Y-1)^2 * Y$ DWs for outbound data. These DWs may be read/write capable to this port, and writes may become visible to the corresponding port such that they are observed in order. In some cases, a delay (of say 2 us) may be permitted from the time of writing to visibility. Specific rules for using the Port-to-Port Scratch space may be defined by host software (e.g., the operating system, virtual machine manager, device class, or in a device-specific way).

Table 2 illustrates an example per-port register structure for Two Ports with both Shared Scratch and Port-to Port-Scratch. Each box illustrated below may include any suitable number of DWs.

TABLE 2

| Port 0 | Port 1 |
| --- | --- |
| Shared (RW) - Writes are visible to both Port 0 and Port 1 at the same time | Shared (RW) - Writes are visible to both Port 0 and Port 1 at the same time |
| Inbound (RO) - Can only be written from Port 1 | Inbound (RO) - Can only be written from Port 0 |
| Outbound (RW) - Writes here are readable by Port 1 in its Inbound space. | Outbound (RW) - Writes here are readable by Port 0 in its Inbound space. |

Table 3 illustrates an example per-port register structure for four ports with both a Shared Scratch and a Port-to-Port Scratch. Each box illustrated below may include any suitable number of DWs.

TABLE 3

| Port 0 | Port 1 | Port 2 | Port 3 |
| --- | --- | --- | --- |
| Shared (RW) - Writes are visible to Port 0, 1, 2, and 3 at the same time | Shared (RW) - Writes are visible to Port 0, 1, 2, and 3 at the same time | Shared (RW) - Writes are visible to Port 0, 1, 2, and 3 at the same time | Shared (RW) - Writes are visible to Port 0, 1, 2, and 3 at the same time |
| Inbound_1 (RO) - Can only be written from Port 1 | Inbound_0 (RO) - Can only be written from Port 0 | Inbound_0 (RO) - Can only be written from Port 0 | Inbound_0 (RO) - Can only be written from Port 0 |
| Inbound_2 (RO) - Can only be written from Port 2 | Inbound_2 (RO) - Can only be written from Port 2 | Inbound_1 (RO) - Can only be written from Port 1 | Inbound_1 (RO) - Can only be written from Port 1 |
| Inbound_3 (RO) - Can only be written from Port 3 | Inbound_3 (RO) - Can only be written from Port 3 | Inbound_3 (RO) - Can only be written from Port 3 | Inbound_2 (RO) - Can only be written from Port 2 |
| Outbound_1 (RW) - Writes here are readable by Port 1 in its Inbound_0 space. | Outbound_0 (RW) - Writes here are readable by Port 0 in its Inbound_1 space. | Outbound_0 (RW) - Writes here are readable by Port 0 in its Inbound_2 space. | Outbound_0 (RW) - Writes here are readable by Port 0 in its Inbound_3 space. |
| Outbound_2 (RW) - Writes here are readable by Port 2 in its Inbound_0 space. | Outbound_2 (RW) - Writes here are readable by Port 2 in its Inbound_1 space. | Outbound_1 (RW) - Writes here are readable by Port 1 in its Inbound_2 space. | Outbound_1 (RW) - Writes here are readable by Port 1 in its Inbound_3 space. |
| Outbound_3 (RW) - Writes here are readable by Port 3 in its Inbound_0 space. | Outbound_3 (RW) - Writes here are readable by Port 3 in its Inbound_1 space. | Outbound_3 (RW) - Writes here are readable by Port 3 in its Inbound_2 space. | Outbound_2 (RW) - Writes here are readable by Port 2 in its Inbound_3 space. |

Figure 7:
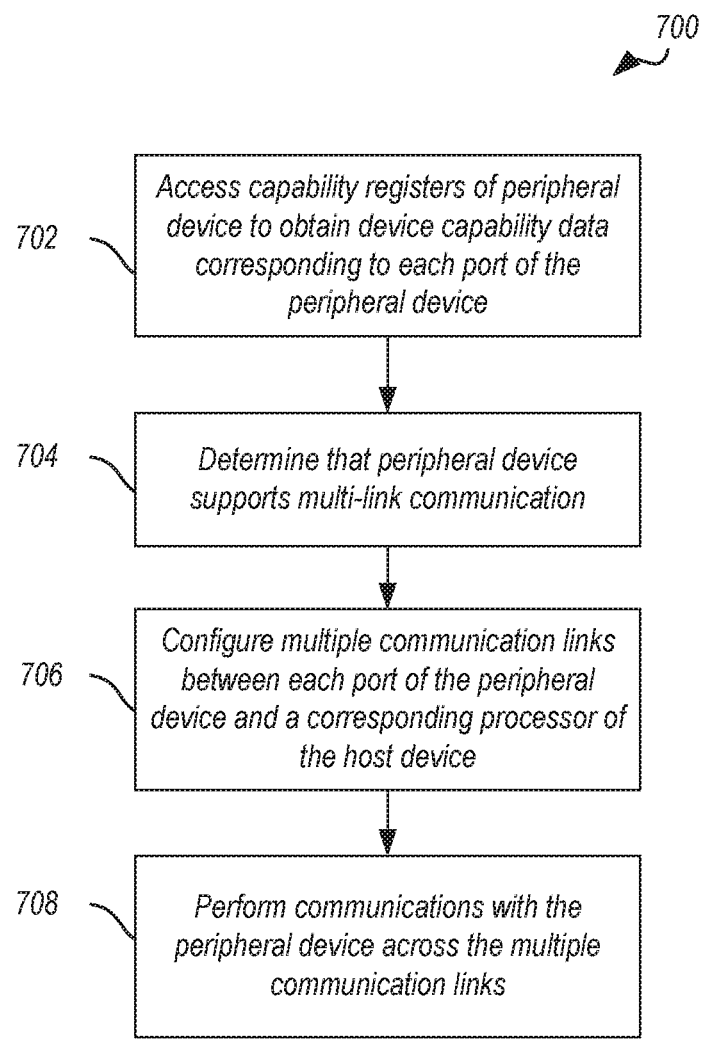
FIG. 7 illustrates an embodiment of a process for configuring multiple communication links between a multi-link peripheral device and one or more processors.

FIG. 7 illustrates an embodiment of a process 700 for configuring multiple communication links between a multi-link peripheral device and one or more processors. Operations in the example process 700 may be performed by components of a host device connected to a peripheral device. The host device may be implemented similar to the system 1100 of FIG. 11 in some instances. The example process 700 may include additional or different operations, and the operations may be performed in the order shown or in another order. In some cases, one or more of the operations shown in FIG. 7 are implemented as processes that include multiple operations, sub-processes, or other types of routines. In some cases, operations can be combined, performed in another order, performed in parallel, iterated, or otherwise repeated or performed another manner.

Figure 12:
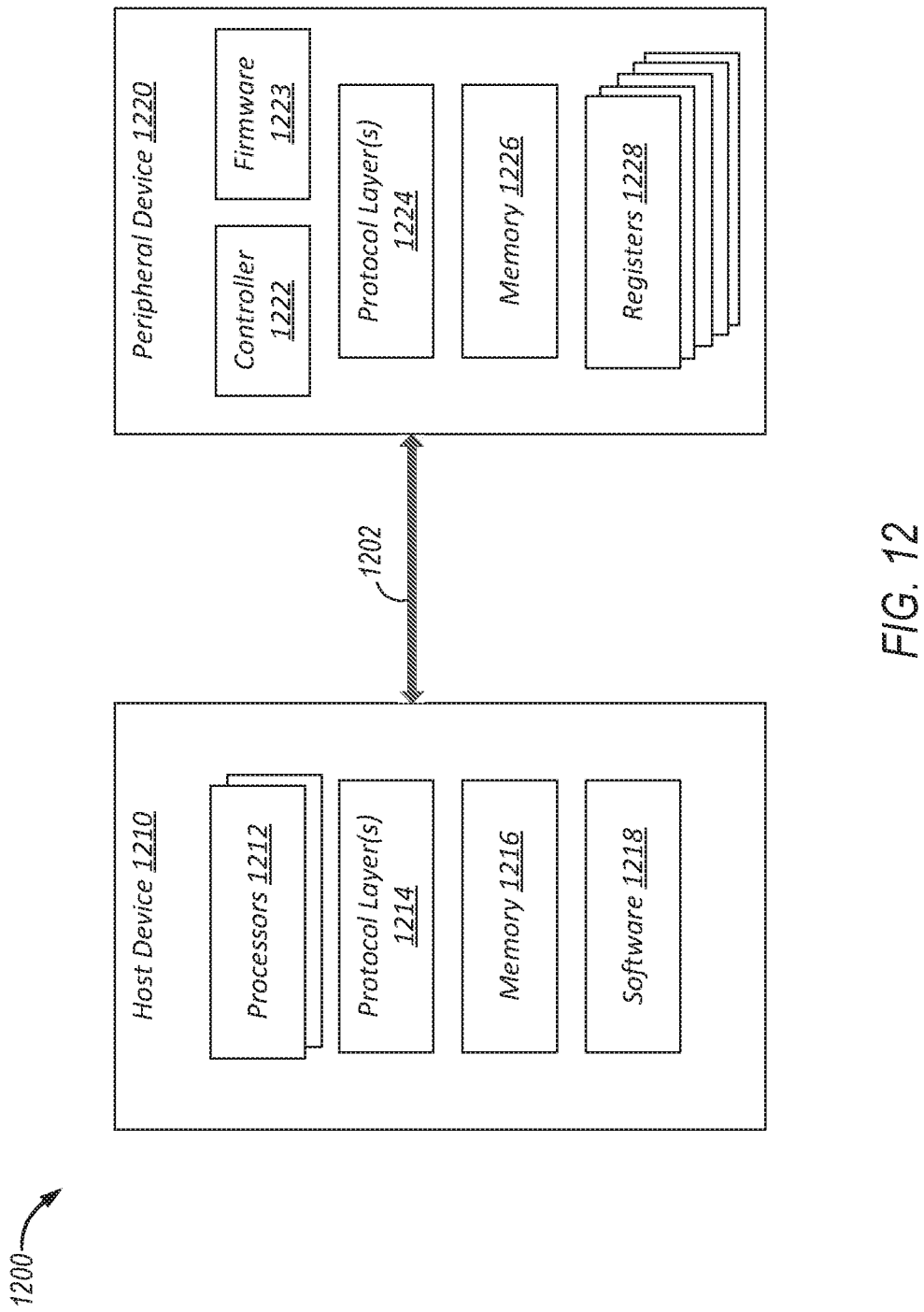
FIG. 12 illustrates an embodiment of an example system that includes a host device connected to a peripheral device using a physical interconnect.

At 702, a host device (e.g., through host software) accesses capability registers of a peripheral device to obtain device capability data stored in the hardware registers. Referring to FIG. 12, for example, the host device 1210 may access device capability data stored in the registers 1228 of the peripheral device 1220. The peripheral device is a multi-link capable device that includes multiple ports for communication with the host device, and each capability register corresponds to a particular port of multi-link device. In some cases, the capability registers are compliant with the PCIe interconnect protocol, and in some cases are in a DVSEC structure. Each capability register may include one or more fields or configuration parameters that indicate the device's multi-link capabilities and that may be used by the host software to configure multi-link communication with the device. For example, each capability register may be implemented similar to the capability register 600 of FIG. 6.

At 704, the host device (e.g., through host software) determines that the peripheral device supports multi-link communication based on the device capability data accessed at 702. This may be based on information in one or more fields of the device capability data. For instance, referring to FIG. 6, the host device may determine that the peripheral device is multi-link capable based on one or more of the Socket, Option, Port #, # Ports, or Capability Vector fields in the capability register structure of FIG. 6.

At 706, the host device (e.g., through host software) configures multiple communication links between the host device and the peripheral device based on the device capability data accessed at 702. The communication links may be over an interconnect architecture and may be compatible with an interconnect protocol (e.g., PCIe). Configuring the multiple communication links may include configuring separate communication links between a first port of the peripheral device and a processor of the host device, and between a second port of the peripheral device and the processor of the host device (e.g., as shown in FIG. 5A). In some instances, configuring the multiple communication links may include configuring separate communication links between a first port of the peripheral device and a first processor of the host device, and between a second port of the peripheral device and a second processor of the host device (e.g., as shown in FIG. 5B). In some instances, configuring the multiple communication links may include configuring separate communication links between a first port of the peripheral device and a processor of a first system processor, and between a second port of the peripheral device and a processor of a second system (e.g., as shown in FIG. 5C). The first and second systems may be part of the same host device, whereby the processors of the host device are configured to function as separate systems, or the first and second systems may be part of different host devices in some cases. In some embodiments, configuring the multiple communication links may include enumerating each device port by a separate instance of the same device driver or enumerating each port by a single device driver (with the host software exposing the device as a single object).

Finally, at 708, the host device (e.g., through host software) performs communications with the peripheral device across the multiple communication links configured at 706. In some embodiments, the configuration of multiple communication links or performance of communications across the multiple communication links may include or involve one or more aspects or operations of the processes 800, 900 described below.

Figure 8:
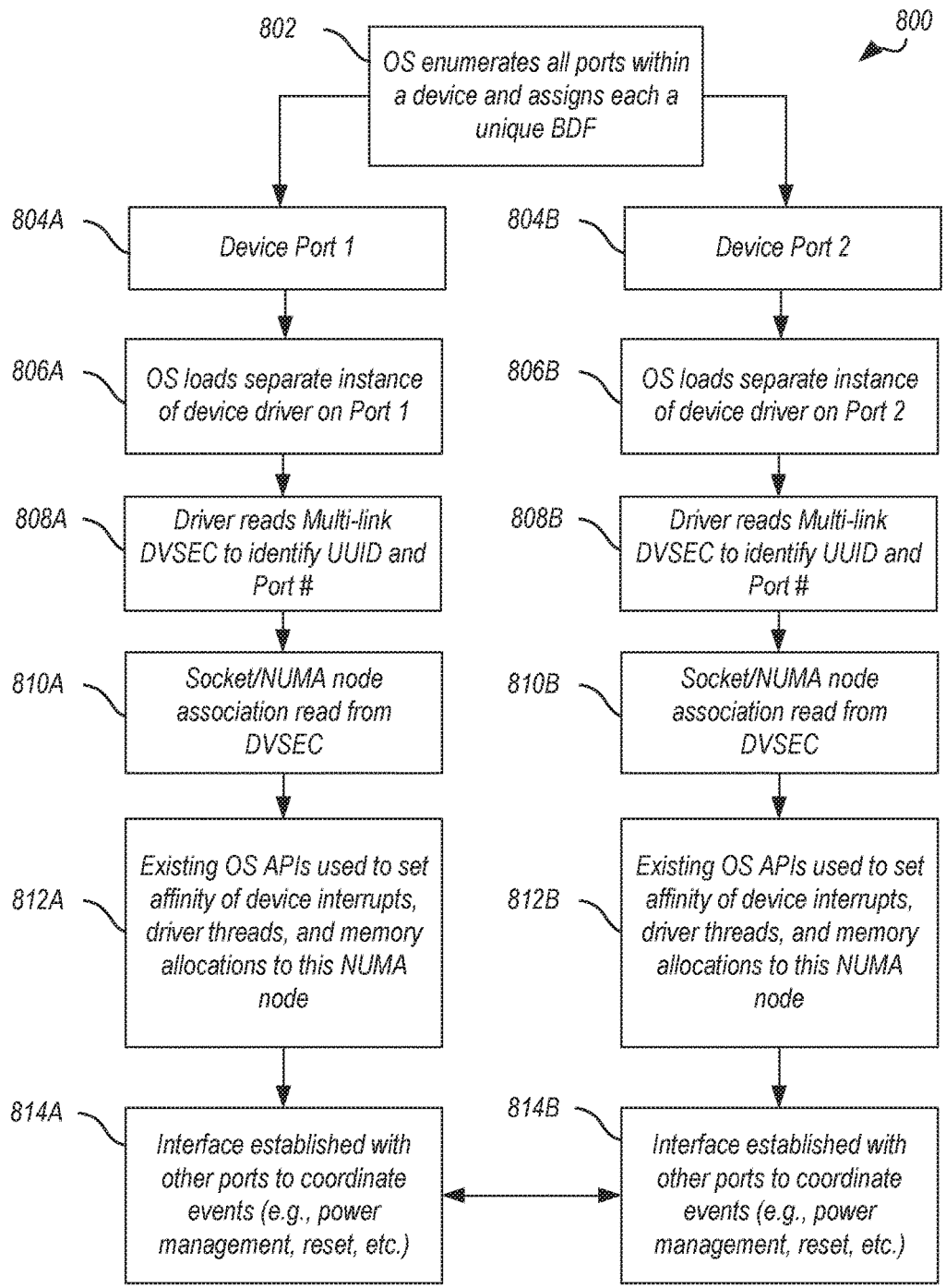
FIG. 8 illustrates an embodiment of another process for configuring multiple communication links between a multi-link peripheral device and one or more processors.

FIG. 8 illustrates an embodiment of another process 800 for configuring multiple communication links between a multi-link peripheral device and one or more processors. Operations in the example process 800 may be performed by components of a host device connected to a peripheral device. The host device may be implemented similar to the system 1100 of FIG. 11 in some instances. The example process 800 may include additional or different operations, and the operations may be performed in the order shown or in another order. In some cases, one or more of the operations shown in FIG. 8 are implemented as processes that include multiple operations, sub-processes, or other types of routines. In some cases, operations can be combined, performed in another order, performed in parallel, iterated, or otherwise repeated or performed another manner.

In the example process 800, each device port is enumerated by a separate instance of the same device driver. As shown in FIG. 8, device driver can use the multi-uplink DVSEC structure of the device to determine a device port's NUMA node association. With this information, the device interrupt affinity, the driver's thread and memory allocation affinity can be associated with the NUMA node to which it is connected. Example Windows OS API that provide this function are WdfInterruptSetExtendedPolicy, KeSetSystemAffinityThreadEx, MmAllocateNodePagesForMdlEx. Ensuring this affinity allows traffic to and from a specific device port to be contained within the socket/NUMA node to which it is connected, hence reducing cross-socket coherent link traffic. Specific events that need to be coordinated between the ports can be done via the port-to-port and shared scratch mechanisms and the commit fence mechanism described above.

At 802, an operating system (OS) of a host device enumerates all ports of a multi-link device and assigns each port a unique bus device function (BDF). In some cases, this may be done by a PCIe driver of the OS. At 804, each port of the device (in this example, two ports) are recognized by the OS.

At 806, the OS loads a separate instance of the device driver on each recognized port. That is, a first driver instance for the peripheral device is loaded for a first port of the device, and a second driver instance for the peripheral device is loaded for a second port of the device.

At 808 and 810, the respective driver instances read the corresponding capability registers (implemented, in this example, by a DVSEC structure) of the peripheral device to obtain device capability information. Each driver instance may access a different capability register of the device. For example, the host may access a first capability register corresponding to the first port of the device, and a second capability register corresponding to the second port of the device. In some cases, reading the capability registers may involve identifying a UUID and port number for the corresponding port (e.g., as in 808), identifying a processor (socket) or NUMA node association for the port (e.g., as in 810), or identifying other device capability information.

At 812, OS application programming interfaces (APIs) are used to set, for each port of the device, an affinity of device interrupts, driver threads, and memory allocations on its corresponding NUMA node or processor (socket). This may allow for reduced cross-socket traffic between different processors of the host device.

At 814, interfaces are established at each port for communication between ports of the device, allowing for coordination of certain device events (e.g., power management, device reset, or the like). The interfaces may be established using the shared scratches or port-to-port scratches, as described above.

Figure 9:
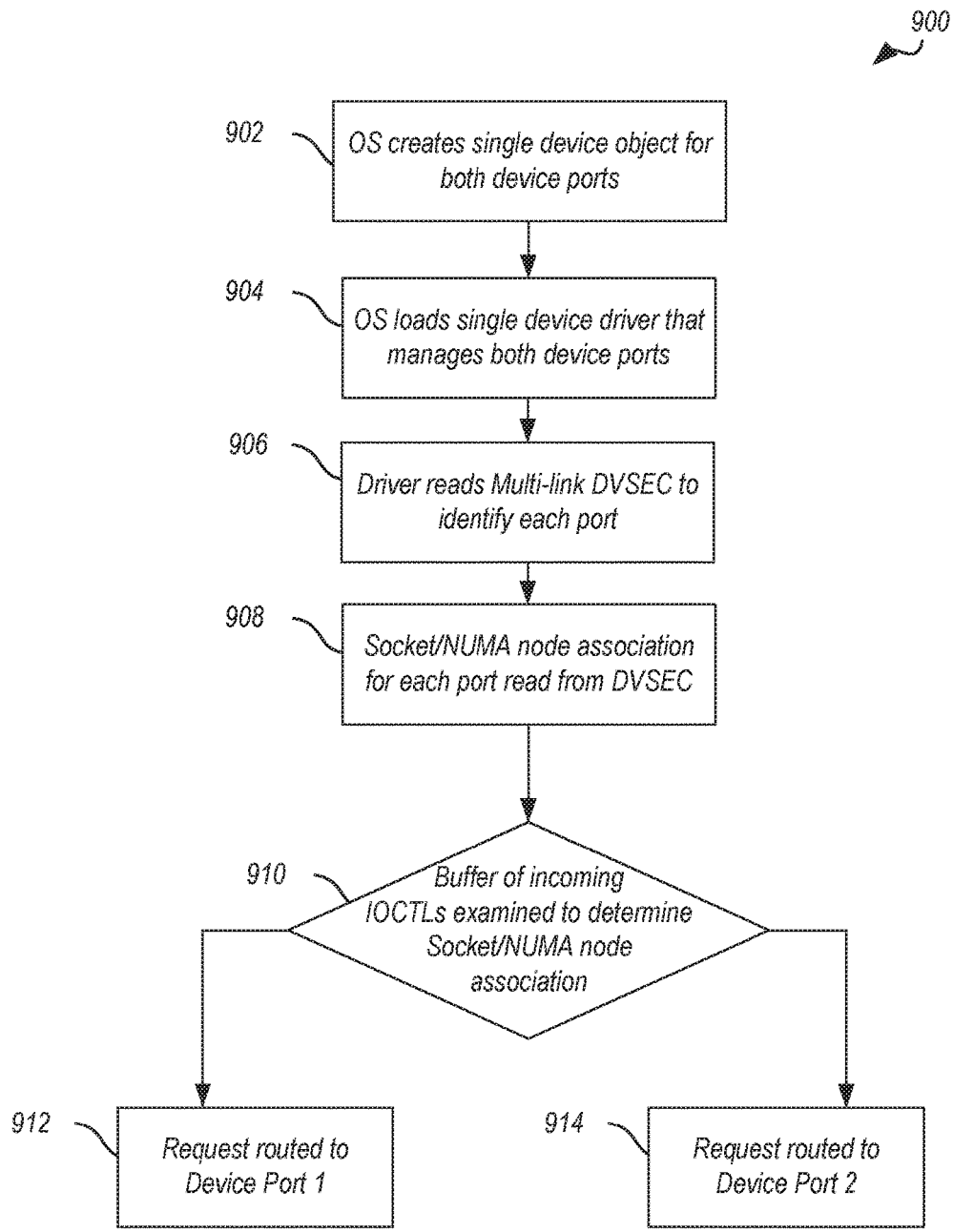
FIG. 9 illustrates another embodiment of a process for configuring multiple communication links between a multi-link peripheral device and one or more processors.

FIG. 9 illustrates another embodiment of a process 900 for configuring multiple communication links between a multi-link peripheral device and one or more processors. Operations in the example process 900 may be performed by components of a host device connected to a peripheral device. The host device may be implemented similar to the system 1100 of FIG. 11 in some instances. The example process 900 may include additional or different operations, and the operations may be performed in the order shown or in another order. In some cases, one or more of the operations shown in FIG. 9 are implemented as processes that include multiple operations, sub-processes, or other types of routines. In some cases, operations can be combined, performed in another order, performed in parallel, iterated, or otherwise repeated or performed another manner.

In the example process 900, each device port is enumerated by a single device driver and the host software (e.g., the operating system) will expose a single device object. As shown in FIG. 9, a single device driver is used to manage both device ports. Requests are routed to the appropriate port based on buffer of incoming IOCTLs. (i.e. by checking NUMA node association of the buffer). To keep the routing to ports fair and balanced, user mode code (or the IOCTL originator) can choose to round robin the buffer allocation between each socket/NUMA node.

At 902, an OS of a host device creates a single device object that will manage each port of the peripheral device (two ports, in this example). In some cases, this may be done by a PCIe driver of the OS. At 904, the OS loads a single device driver for managing each of the ports of the multi-link device.

At 906, the device driver reads the capability registers of the peripheral device to identify each port of the device, and at 908, identifies a processor (socket) or NUMA node association from the capability registers. The driver may access a different capability register for each port of the device. For example, the host may access a first capability register corresponding to the first port of the device, and a second capability register corresponding to the second port of the device.

At 910, a buffer of incoming input/output control messages (IOCTLs) is examined to determine a NUMA node or processor association. Based on the node association, the IOCTL is either routed to the first port at 912 or to the second port of the device at 914.

Note that the apparatus', methods', and systems described above may be implemented in any electronic device or system as aforementioned. As specific illustrations, the figures described below provide exemplary systems for utilizing the present disclosure. As the systems below are described in more detail, a number of different interconnects are disclosed, described, and revisited from the discussion above. And as is readily apparent, the advances described above may be applied to any of those interconnects, fabrics, or architectures. For instance, a host and device may be implemented, which are equipped with functionality to implement authentication and measurement architectures as discussed in the examples above, in any one of a variety of computing architectures (e.g., using any one of a variety of different interconnects or fabrics). For instance, a host may connect to a device supporting the authentication architecture within a personal computing system (e.g., implemented in a laptop, desktop, mobile, smartphone, Internet of Things (IoT) device, smart appliance, gaming console, media console, etc.). In another example, a host may connect to a device supporting the authentication architecture within a server computing system (e.g., a rack server, blade server, tower server, rack scale server architecture or other disaggregated server architecture), among other examples.

Figure 10:
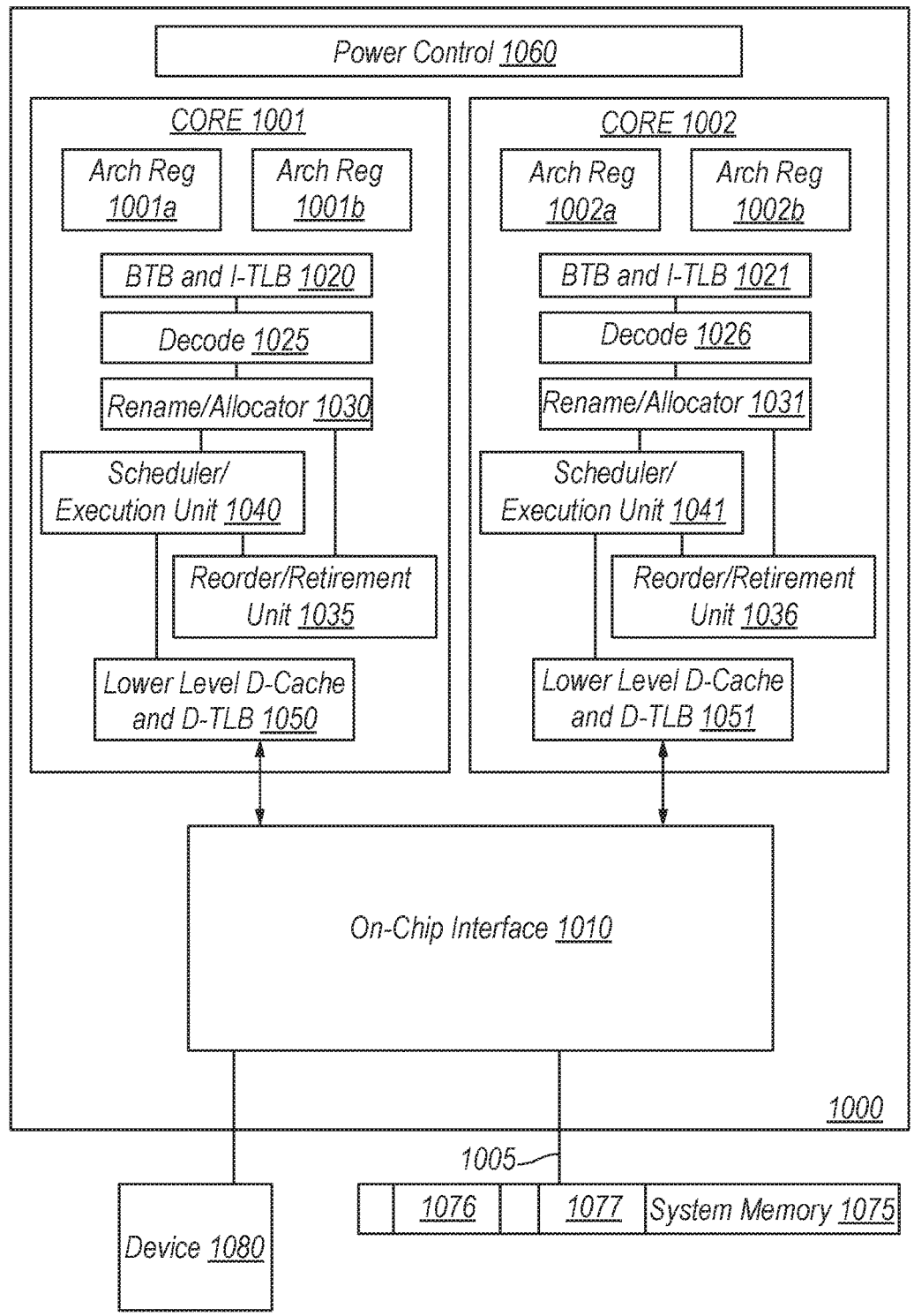
FIG. 10 illustrates an embodiment of a block diagram for a computing system including a multicore processor.

Referring to FIG. 10, an embodiment of a block diagram for a computing system including a multicore processor is depicted. Processor 1000 includes any processor or processing device, such as a microprocessor, an embedded processor, a digital signal processor (DSP), a network processor, a handheld processor, an application processor, a co-processor, a system on a chip (SOC), or other device to execute code. Processor 1000, in one embodiment, includes at least two cores—core 1001 and 1002, which may include asymmetric cores or symmetric cores (the illustrated embodiment). However, processor 1000 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1000, as illustrated in FIG. 10, includes two cores—core 1001 and 1002. Here, core 1001 and 1002 are considered symmetric cores, i.e. cores with the same configurations, functional units, and/or logic. In another embodiment, core 1001 includes an out-of-order processor core, while core 1002 includes an in-order processor core. However, cores 1001 and 1002 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1001 are described in further detail below, as the units in core 1002 operate in a similar manner in the depicted embodiment.

As depicted, core 1001 includes two hardware threads 1001a and 1001b, which may also be referred to as hardware thread slots 1001a and 1001b. Therefore, software entities, such as an operating system, in one embodiment potentially view processor 1000 as four separate processors, i.e., four logical processors or processing elements capable of executing four software threads concurrently. As alluded to above, a first thread is associated with architecture state registers 1001a, a second thread is associated with architecture state registers 1001b, a third thread may be associated with architecture state registers 1002a, and a fourth thread may be associated with architecture state registers 1002b. Here, each of the architecture state registers (1001a, 1001b, 1002a, and 1002b) may be referred to as processing elements, thread slots, or thread units, as described above. As illustrated, architecture state registers 1001a are replicated in architecture state registers 1001b, so individual architecture states/contexts are capable of being stored for logical processor 1001a and logical processor 1001b. In core 1001, other smaller resources, such as instruction pointers and renaming logic in allocator and renamer block 1030 may also be replicated for threads 1001a and 1001b. Some resources, such as re-order buffers in reorder/retirement unit 1035, ILTB 1020, load/store buffers, and queues may be shared through partitioning. Other resources, such as general purpose internal registers, page-table base register(s), low-level data-cache and data-TLB 1015, execution unit(s) 1040, and portions of out-of-order unit 1035 are potentially fully shared.

Processor 1000 often includes other resources, which may be fully shared, shared through partitioning, or dedicated by/to processing elements. In FIG. 10, an embodiment of a purely exemplary processor with illustrative logical units/resources of a processor is illustrated. Note that a processor may include, or omit, any of these functional units, as well as include any other known functional units, logic, or firmware not depicted. As illustrated, core 1001 includes a simplified, representative out-of-order (OOO) processor core. But an in-order processor may be utilized in different embodiments. The OOO core includes a branch target buffer 1020 to predict branches to be executed/taken and an instruction-translation buffer (I-TLB) 1020 to store address translation entries for instructions.

Core 1001 further includes decode module 1025 coupled to fetch unit 1020 to decode fetched elements. Fetch logic, in one embodiment, includes individual sequencers associated with thread slots 1001a, 1001b, respectively. Usually core 1001 is associated with a first ISA, which defines/specifies instructions executable on processor 1000. Often machine code instructions that are part of the first ISA include a portion of the instruction (referred to as an opcode), which references/specifies an instruction or operation to be performed. Decode logic 1025 includes circuitry that recognizes these instructions from their opcodes and passes the decoded instructions on in the pipeline for processing as defined by the first ISA. For example, as discussed in more detail below decoders 1025, in one embodiment, include logic designed or adapted to recognize specific instructions, such as transactional instruction. As a result of the recognition by decoders 1025, the architecture or core 1001 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1026, in one embodiment, recognize the same ISA (or a subset thereof). Alternatively, in a heterogeneous core environment, decoders 1026 recognize a second ISA (either a subset of the first ISA or a distinct ISA).

In one example, allocator and renamer block 1030 includes an allocator to reserve resources, such as register files to store instruction processing results. However, threads 1001a and 1001b are potentially capable of out-of-order execution, where allocator and renamer block 1030 also reserves other resources, such as reorder buffers to track instruction results. Unit 1030 may also include a register renamer to rename program/instruction reference registers to other registers internal to processor 1000. Reorder/retirement unit 1035 includes components, such as the reorder buffers mentioned above, load buffers, and store buffers, to support out-of-order execution and later in-order retirement of instructions executed out-of-order.

Scheduler and execution unit(s) block 1040, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1050 are coupled to execution unit(s) 1040. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1001 and 1002 share access to higher-level or further-out cache, such as a second level cache associated with on-chip interface 1010. Note that higher-level or further-out refers to cache levels increasing or getting further way from the execution unit(s). In one embodiment, higher-level cache is a last-level data cache—last cache in the memory hierarchy on processor 1000—such as a second or third level data cache. However, higher level cache is not so limited, as it may be associated with or include an instruction cache. A trace cache—a type of instruction cache—instead may be coupled after decoder 1025 to store recently decoded traces. Here, an instruction potentially refers to a macro-instruction (i.e. a general instruction recognized by the decoders), which may decode into a number of micro-instructions (micro-operations).

In the depicted configuration, processor 1000 also includes on-chip interface module 1010. Historically, a memory controller, which is described in more detail below, has been included in a computing system external to processor 1000. In this scenario, on-chip interface 1010 is to communicate with devices external to processor 1000, such as system memory 1075, a chipset (often including a memory controller hub to connect to memory 1075 and an I/O controller hub to connect peripheral devices), a memory controller hub, a northbridge, or other integrated circuit. And in this scenario, bus 1005 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1075 may be dedicated to processor 1000 or shared with other devices in a system. Common examples of types of memory 1075 include DRAM, SRAM, non-volatile memory (NV memory), and other known storage devices. Note that device 1080 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1000. For example in one embodiment, a memory controller hub is on the same package and/or die with processor 1000. Here, a portion of the core (an on-core portion) 1010 includes one or more controller(s) for interfacing with other devices such as memory 1075 or a graphics device 1080. The configuration including an interconnect and controllers for interfacing with such devices is often referred to as an on-core (or un-core configuration). As an example, on-chip interface 1010 includes a ring interconnect for on-chip communication and a high-speed serial point-to-point link 1005 for off-chip communication. Yet, in the SOC environment, even more devices, such as the network interface, co-processors, memory 1075, graphics processor 1080, and any other known computer devices/interface may be integrated on a single die or integrated circuit to provide small form factor with high functionality and low power consumption.

In one embodiment, processor 1000 is capable of executing a compiler, optimization, and/or translator code 1077 to compile, translate, and/or optimize application code 1076 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 11:
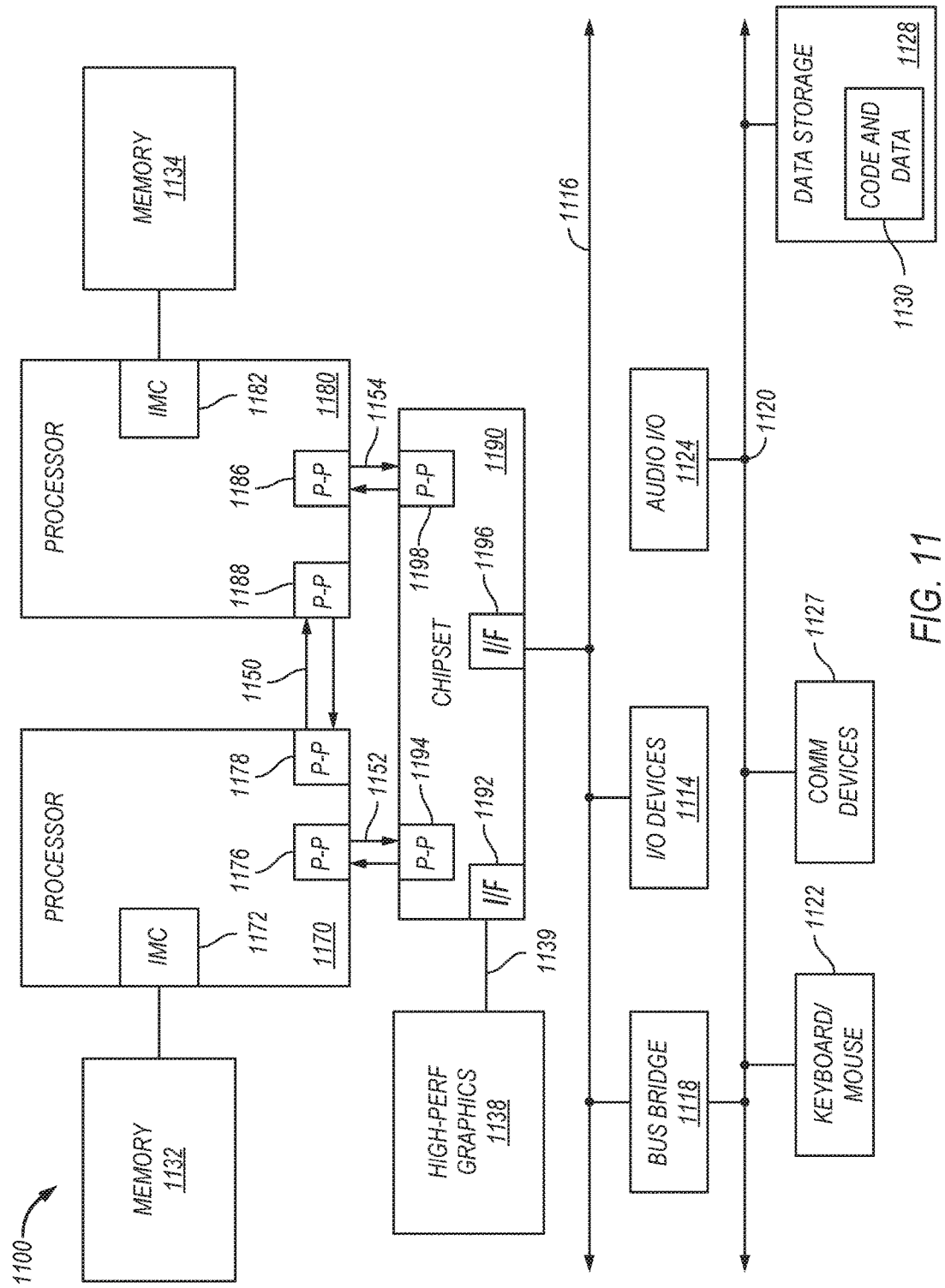
FIG. 11 illustrates an embodiment of a block for a computing system including multiple processors.

Referring now to FIG. 11, shown is a block diagram of another system 1100 in accordance with an embodiment of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of a processor. In one embodiment, 1152 and 1154 are part of a serial, point-to-point coherent interconnect fabric, such as a high-performance architecture. As a result, certain embodiments may be implemented within the QPI architecture.

While shown with only two processors 1170, 1180, it is to be understood that the scope of the present disclosure is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 each exchange information with a chipset 1190 via individual P-P interfaces 1152, 1154 using point to point interface circuits 1176, 1194, 1186, 1198. Chipset 1190 also exchanges information with a high-performance graphics circuit 1138 via an interface circuit 1192 along a high-performance graphics interconnect 1139.

A shared cache (not shown) may be included in either processor or outside of both processors; yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 are coupled to first bus 1116, along with a bus bridge 1118 which couples first bus 1116 to a second bus 1120. In one embodiment, second bus 1120 includes a low pin count (LPC) bus. Various devices are coupled to second bus 1120 including, for example, a keyboard and/or mouse 1122, communication devices 1127 and a storage unit 1128 such as a disk drive or other mass storage device which often includes instructions/code and data 1130, in one embodiment. Further, an audio I/O 1124 is shown coupled to second bus 1120. Note that other architectures are possible, where the included components and interconnect architectures vary. For example, instead of the point-to-point architecture of FIG. 11, a system may implement a multi-drop bus or other such architecture.

FIG. 12 illustrates an embodiment of an example system 1200 that includes a host device 1210 connected to a peripheral device 1220 using a physical interconnect 1202. In some cases, the interconnect 1202 is configured to implement a protocol compliant with a PCIe-based protocol. An example host may include one or more processors (e.g., 1210), computer memory (e.g., 1214), to implement system software (e.g., 1218). Protocol layer logic (e.g., 1214) may be provided (e.g., in one or more ports of the host 1210) to implement a link and stack of a particular protocol (e.g., PCIe, Gen-Z™, UPI, Cache Coherent Interconnect for Accelerators (CCIX™), Advanced Micro Device™'s (AMD™) Infinity™, Common Communication Interface (CCI), Qualcomm™'s Centriq™, etc.) over physical interconnect 1202. System software 1218 may include software to manage the host system 1210 and connections to peripheral devices, such as device 1220. In some implementations, the host software 1218 may configure multiple communication links between the host 1210 and interfaces of the device 1220 over the physical interconnect (e.g., as described above with respect to FIGS. 7-9). In still other examples, the "device" may be integrated with the host, and/or the device may have its own computing capability with local firmware/software independent of the host, and/or that a single processor may be operating on behalf of a complex device that is exposed through multiple functions (e.g., a switch) and/or even multiple logical devices (e.g. a switch with one or more additional devices logically appearing below the switch, among other example implementations).

An example device (e.g., 1210), such as a PCIe device, may include a microcontroller (e.g., 1222) and corresponding firmware (e.g., 1223). The PCIe device 1220 may likewise include protocol layer logic 1224 (e.g., implemented in hardware circuitry of the device 1220) to implement a protocol stack of a PCIe-based protocol, which may be used to establish one or more links and communicate with host 1210 over the link(s). In some implementations, such as in the example of a PCIe device, a set of hardware registers (e.g., 1228) may be provided on the device 1220 and the registers may be populated and read (e.g., using authentication engine) to allow the communication of messages or instructions with the host 1210 in an authentication architecture. In one example, the registers 1228 may include registers defined and provisioned on the device 1220 as extended capability registers under PCIe. For instance, the registers 1228 may include registers to indicate characteristics of the device 1220, including its model, vendor, multi-link capabilities (e.g., as described above), and other features of the device 1220.

The foregoing disclosure has presented a number of example testing link states, which may supplement standard link states defined in an interconnect protocol. It should be appreciated that other testing link states may be provided in addition to those identified above without departing from the more generalized principles contained within this disclosure. For instance, while some of the example state machines and ordered sequences discussed herein were described with reference to PCIe or PCIe-based protocols, it should be appreciated that similar, corresponding enhancements may be made to other interconnect protocols, such OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centriq™ interconnect, among others.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform certain embodiments may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification.

Example 1 includes a device comprising a plurality of ports, wherein the device is to connect to one or more processors of a host device through the plurality of ports, and each of the plurality of ports comprises a respective protocol stack to support a respective link between the corresponding port and the host device according to a particular interconnect protocol. The device further includes a plurality of capability registers, wherein each of the plurality of capability registers corresponds to a respective one of the plurality of ports. Each of the plurality of capability registers comprises a respective set of fields for use in configuration or identification of the link between the corresponding port and one of the one or more processors of the host device. The set of fields comprises: a first field to indicate an association between the port and a particular processor of the one or more processors of the host device; a second field to indicate a port identifier for the port; and a third field to indicate a total number of ports in the plurality of ports of the device.

Example 2 includes the subject matter of Example 1, and optionally, wherein the set of fields further comprises another field to indicate a dependency of the corresponding port on other ports in the plurality of ports.

Example 3 includes the subject matter of Example 1, and optionally, wherein the set of fields further comprises one or more fields for establishing operation checkpoints for the corresponding port.

Example 4 includes the subject matter of Example 3, and optionally, wherein the one or more fields for establishing operation checkpoints comprise a read-write capable first value for indicating a checkpoint and second read-only value for polling by software of the host device.

Example 5 includes the subject matter of Example 1, and optionally, wherein each capability register further comprises a mailbox to facilitate communication with other ports in the plurality of ports.

Example 6 includes the subject matter of Example 5, and optionally, wherein the mailbox comprises one or more of: a shared scratch space that is for shared communication between the ports; and a port-to-port scratch space that is for port-to-port communication.

Example 7 includes the subject matter of Example 6, and optionally, wherein the shared scratch space is read/write-capable for each of the plurality of ports, and the port-to-port scratch space comprises a first subset that is read-only and a second subset that is read/write-capable.

Example 8 includes the subject matter of any one of Examples 1-7, and optionally, wherein the set of fields further comprises one or more fields indicating a Universally Unique Identifier (UUID) of the device.

Example 9 includes the subject matter of any one of Examples 1-7, and optionally, wherein the interconnect protocol comprises a Peripheral Component Interconnect Express (PCIe)-based protocol, and the capability registers are compliant with the PCIe-based protocol.

Example 10 includes the subject matter of any one of Examples 1-7, and optionally, wherein the capability registers each comprise a respective Designated Vendor-Specific Extended Capability (DVSEC) structure.

Example 11 includes a system, comprising: a first processor; a second processor coupled to the first processor by a coherent interconnect; system software; and a multi-link peripheral device. The multi-link peripheral device comprises a first port to couple the device to the first processor and a second port to couple the device to the second processor, wherein the device further comprises a first capability register corresponding to the first port and a second capability register corresponding to the second port. Each of the first capability register and the second capability register stores a respective set of configuration parameters for use in configuration or identification of a respective link between the corresponding port and the corresponding processor. Each set of configuration parameters comprises a first parameter indicating an association between the port and its corresponding processor; a second parameter indicating a port identifier for the port; and a third parameter indicating a total number of ports of the peripheral device. The system software is executable to configure multi-link communication between the device and the first and second processors based on the configuration parameters in the first and second capability registers of the device.

Example 12 includes the subject matter of Example 11, and optionally, wherein the set of configuration parameters further comprises another field to indicate a dependency of the corresponding port on other ports in the plurality of ports.

Example 13 includes the subject matter of Example 11, and optionally, wherein the set of configuration parameters further comprises one or more fields for establishing operation checkpoints for the corresponding port.

Example 14 includes the subject matter of Example 13, and optionally, wherein the one or more fields for establishing operation checkpoints comprise a read-write capable first value for indicating a checkpoint and second read-only value for polling by software of the host device.

Example 15 includes the subject matter of Example 11, and optionally, wherein each capability register further comprises a mailbox to facilitate communication with other ports in the plurality of ports.

Example 16 includes the subject matter of Example 15, and optionally, wherein the mailbox comprises one or more of: a shared scratch space that is for shared communication between the ports; and a port-to-port scratch space that is for port-to-port communication.

Example 17 includes the subject matter of Example 16, and optionally, wherein the shared scratch space is read/write-capable for each of the plurality of ports, and the port-to-port scratch space comprises a first subset that is read-only and a second subset that is read/write-capable.

Example 18 includes the subject matter of any one of Examples 11-17, and optionally, wherein the set of fields further comprises one or more fields indicating a Universally Unique Identifier (UUID) of the device.

Example 19 includes the subject matter of any one of Examples 11-17, and optionally, wherein each of the first and second capability register comprises a capability structure compliant with a Peripheral Component Interconnect Express (PCIe)-based protocol.

Example 20 includes the subject matter of any one of Examples 11-17, and optionally, wherein the capability structure comprises a Designated Vendor-Specific Extended Capability (DVSEC) structure.

Example 21 includes a computer program product tangibly embodied on non-transitory computer-readable media, the computer program product comprising instructions that, when executed by a machine, cause the machine to: access a first capability register on a peripheral device to identify first capability data corresponding to a first port of the peripheral device, wherein the peripheral device is to connect to a first processor on a host via the first port; access a second capability register on the peripheral device to identify second capability data corresponding to a second port of the peripheral device, wherein the peripheral device is to connect to a second processor on the host via the second port; determine, based on at least one of the first device capability data and the second device capability data, that the peripheral device supports multi-link communication; configure, based on the first device capability data, a first link between the peripheral device and the first processor; and configure, based on the second device capability data, a second link between the peripheral device and the second processor, wherein configuration or identification of the first and second links comprises writing values to at least one of the first and second capability registers.

Example 22 includes the subject matter of Example 21, and optionally, wherein the instructions when executed further cause the machine to: enumerate the first port using a first driver instance for the peripheral device, wherein the first driver instance manages communications over the first link; and enumerate the second port using a second driver instance for the peripheral device, wherein the second driver instance manages communications over the second link.

Example 23 includes the subject matter of Example 22, and optionally, wherein the instructions when executed further cause the machine to set, for each of the first and second link based on node association information in the device capability data, a device interrupt affinity and memory allocation affinity.

Example 24 includes the subject matter of Example 21, and optionally, wherein the instructions when executed further cause the machine to: enumerate the first port using a driver instance for the peripheral device; and enumerate the second port using the same driver instance as the first port; wherein the driver instance manages communications over the first and second links.

Example 25 includes the subject matter of Example 24, and optionally, wherein the instructions when executed further cause the machine to determine a node association for each incoming communication and direct the communication to a particular node based on the node association.

Example 25 includes the subject matter of Example 25, and optionally, wherein the node association indicates an association between a particular port that originated the incoming communication and a particular non-uniform memory access (NUMA) node or processor of the host device.

Example 26 includes the subject matter of any one of Examples 21-25, and optionally, wherein the instructions when executed further cause the machine to identify one or more of a universally unique identifier (UUID), one or more port numbers for the peripheral device in the device capability data, and node association information in each of the first and second device capability data.

Example 27 includes a method comprising accessing a first capability register on a peripheral device to identify first capability data corresponding to a first port of the peripheral device, wherein the peripheral device is to connect to a first processor on a host via the first port; accessing a second capability register on the peripheral device to identify second capability data corresponding to a second port of the peripheral device, wherein the peripheral device is to connect to a second processor on the host via the second port; determining, based on at least one of the first device capability data and the second device capability data, that the peripheral device supports multi-link communication; and configuring, based on the first and second device capability data, a first link between the peripheral device and the first processor and a second link between the peripheral device and the second processor, wherein configuration or identification of the first and second links comprises writing values to at least one of the first and second capability registers.

Example 28 includes the subject matter of Example 27, and optionally, further comprising enumerating the first port using a first driver instance for the peripheral device, wherein the first driver instance manages communications over the first link; and enumerating the second port using a second driver instance for the peripheral device, wherein the second driver instance manages communications over the second link.

Example 29 includes the subject matter of Example 28, and optionally, further comprising setting, for each of the first and second link based on node association information in the device capability data, a device interrupt affinity and memory allocation affinity.

Example 30 includes the subject matter of Example 27, and optionally, further comprising enumerating the first port using a driver instance for the peripheral device; and enumerating the second port using the same driver instance as the first port; wherein the driver instance manages communications over the first and second links.

Example 31 includes the subject matter of Example 30, and optionally, further comprising determining a node association for each incoming communication and direct the communication to a particular node based on the node association.

Example 32 includes the subject matter of Example 31, and optionally, wherein the node association indicates an association between a particular port that originated the incoming communication and a particular non-uniform memory access (NUMA) node or processor of the host device.

Example 33 includes the subject matter of any one of Examples 27-32, and optionally, further comprising identifying one or more of a universally unique identifier (UUID), one or more port numbers for the peripheral device in the device capability data, and node association information in each of the first and second device capability data.

Example 34 includes a system comprising means for accessing a first capability register on a peripheral device to identify first capability data corresponding to a first port of the peripheral device, wherein the peripheral device is to connect to a first processor on a host via the first port; means for accessing a second capability register on the peripheral device to identify second capability data corresponding to a second port of the peripheral device, wherein the peripheral device is to connect to a second processor on the host via the second port; means for determining, based on at least one of the first device capability data and the second device capability data, that the peripheral device supports multi-link communication; and means for configuring, based on the first and second device capability data, a first link between the peripheral device and the first processor and a second link between the peripheral device and the second processor, wherein configuration or identification of the first and second links comprises writing values to at least one of the first and second capability registers.

Example 35 includes the subject matter of Example 34, and optionally, further comprising means for enumerating the first port using a first driver instance for the peripheral device, wherein the first driver instance manages communications over the first link; and means for enumerating the second port using a second driver instance for the peripheral device, wherein the second driver instance manages communications over the second link.

Example 36 includes the subject matter of Example 35, and optionally, further comprising means for setting, for each of the first and second link based on node association information in the device capability data, a device interrupt affinity and memory allocation affinity.

Example 37 includes the subject matter of Example 34, and optionally, further comprising means for enumerating the first port using a driver instance for the peripheral device; and means for enumerating the second port using the same driver instance as the first port; wherein the driver instance manages communications over the first and second links.

Example 38 includes the subject matter of Example 37, and optionally, further comprising means for determining a processor association for each incoming communication and direct the communication to a particular processor based on the processor association.

Example 40 includes the subject matter of any one of Examples 34-39, and optionally, further comprising means for identifying one or more of a universally unique identifier (UUID), one or more port numbers for the peripheral device in the device capability data, and node association information in each of the first and second device capability data.

Example 41 includes the subject matter of Example 11, and optionally, wherein the system software is executable to configure multi-link communication between the device and the first and second processors based on the configuration parameters in the first and second capability registers of the device by performing one or more of the steps of Examples 28-32.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A device comprising:
a plurality of ports, wherein the device is to connect to one or more processors of a host device through the plurality of ports, and each of the plurality of ports comprises a respective protocol stack to support a respective link between the corresponding port and the host device according to a particular interconnect protocol;
a plurality of capability registers, wherein each of the plurality of capability registers corresponds to a respective one of the plurality of ports, wherein each of the plurality of capability registers comprises a respective set of fields for use in configuration or identification of the link between the corresponding port and one of the one or more processors of the host device, wherein the set of fields comprises:
a first field to indicate an association between the port and a particular processor of the one or more processors of the host device;
a second field to indicate a port identifier for the port; and
a third field to indicate a total number of ports in the plurality of ports of the device.

2. The device of claim 1, wherein the set of fields further comprises another field to indicate a dependency of the corresponding port on other ports in the plurality of ports.

3. The device of claim 1, wherein the set of fields further comprises one or more fields for establishing operation checkpoints for the corresponding port.

4. The device of claim 3, wherein the one or more fields for establishing operation checkpoints comprise a read-write capable first value for indicating a checkpoint and second read-only value for polling by software of the host device.

5. The device of claim 1, wherein each capability register further comprises a mailbox to facilitate communication with other ports in the plurality of ports.

6. The device of claim 5, wherein the mailbox comprises one or more of:
a shared scratch space that is for shared communication between the ports; and
a port-to-port scratch space that is for port-to-port communication.

7. The device of claim 6, wherein the shared scratch space is read/write-capable for each of the plurality of ports, and the port-to-port scratch space comprises a first subset that is read-only and a second subset that is read/write-capable.

8. The device of claim 1, wherein the set of fields further comprises one or more fields indicating a Universally Unique Identifier (UUID) of the device.

9. The device of claim 1, wherein the interconnect protocol comprises a Peripheral Component Interconnect Express (PCIe)-based protocol, and the capability registers are compliant with the PCIe-based protocol.

10. The device of claim 9, wherein the capability registers each comprise a respective Designated Vendor-Specific Extended Capability (DVSEC) structure.

11. A system, comprising:
a first processor;
a second processor coupled to the first processor by a coherent interconnect;
system software; and
a multi-link peripheral device comprising a first port to couple the device to the first processor and a second port to couple the device to the second processor, wherein the device further comprises a first capability register corresponding to the first port and a second capability register corresponding to the second port, wherein each of the first capability register and the second capability register stores a respective set of configuration parameters for use in configuration or identification of a respective link between the corresponding port and the corresponding processor, and the set of configuration parameters comprises:
a first parameter indicating an association between the port and its corresponding processor;
a second parameter indicating a port identifier for the port; and
a third parameter indicating a total number of ports of the peripheral device;
wherein the system software is executable to configure multi-link communication between the device and the first and second processors based on the configuration parameters in the first and second capability registers of the device.

12. The system of claim 11, wherein each of the first and second capability register comprises a capability structure compliant with a Peripheral Component Interconnect Express (PCIe)-based protocol.

13. The system of claim 12, wherein the capability structure comprises a Designated Vendor-Specific Extended Capability (DVSEC) structure.

14. A computer program product tangibly embodied on non-transitory computer-readable media, the computer program product comprising instructions that, when executed by a machine, cause the machine to:
access a first capability register on a peripheral device to identify first capability data corresponding to a first port of the peripheral device, wherein the peripheral device is to connect to a first processor on a host via the first port;
access a second capability register on the peripheral device to identify second capability data corresponding to a second port of the peripheral device, wherein the peripheral device is to connect to a second processor on the host via the second port;
determine, based on at least one of the first capability data and the second capability data, that the peripheral device supports multi-link communication;
configure, based on the first device capability data, a first link between the peripheral device and the first processor; and
configure, based on the second device capability data, a second link between the peripheral device and the second processor;
wherein configuration of the first and second links comprises writing values to at least one of the first and second capability registers.

15. The computer program product of claim 14, wherein the instructions when executed further cause the machine to:
- enumerate the first port using a first driver instance for the peripheral device, wherein the first driver instance manages communications over the first link; and
- enumerate the second port using a second driver instance for the peripheral device, wherein the second driver instance manages communications over the second link.

16. The computer program product of claim 15, wherein the instructions when executed further cause the machine to set, for each of the first and second link based on node association information in the first and second capability data, a device interrupt affinity and memory allocation affinity.

17. The computer program product of claim 14, wherein the instructions when executed further cause the machine to:
- enumerate the first port using a driver instance for the peripheral device; and
- enumerate the second port using the same driver instance as the first port; wherein the driver instance manages communications over the first and second links.

18. The computer program product of claim 17, wherein the instructions when executed further cause the machine to determine a node association for each incoming communication and direct the communication to a particular node based on the node association.

19. The computer program product of claim 18, wherein the node association indicates an association between a particular port that originated the incoming communication and a particular non-uniform memory access (NUMA) node or processor of the host.

20. The computer program product of claim 14, wherein the instructions when executed further cause the machine to identify one or more of a universally unique identifier (UUID), one or more port numbers for the peripheral device in the device capability data, and node association information in each of the first and second device capability data.

* * * * *